United States Patent
Jahnke et al.

(10) Patent No.: US 6,859,852 B2
(45) Date of Patent: Feb. 22, 2005

(54) IMMEDIATE GRANT BUS ARBITER FOR BUS SYSTEM

(75) Inventors: Steven R. Jahnke, Tokyo (JP); Hiromichi Hamakawa, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 469 days.

(21) Appl. No.: 09/932,718

(22) Filed: Aug. 17, 2001

(65) Prior Publication Data

US 2002/0032820 A1 Mar. 14, 2002

Related U.S. Application Data

(60) Provisional application No. 60/231,484, filed on Sep. 8, 2000.

(51) Int. Cl.$^7$ .............................................. G06F 13/38
(52) U.S. Cl. .......................... 710/243; 710/306; 710/61
(58) Field of Search ................................ 710/240–244, 710/260–266, 107; 711/151; 709/251

(56) References Cited

U.S. PATENT DOCUMENTS

| | | | | |
|---|---|---|---|---|
| 5,572,230 A | * | 11/1996 | Takano et al. | 345/68 |
| 5,577,214 A | * | 11/1996 | Bhattacharya | 710/107 |
| 5,621,898 A | * | 4/1997 | Wooten | 710/117 |
| 6,173,348 B1 | * | 1/2001 | Hewitt | 710/107 |
| 6,199,132 B1 | * | 3/2001 | Hewitt et al. | 710/107 |
| 6,426,032 B1 | * | 7/2002 | Osuka et al. | 264/328.9 |
| 6,463,491 B1 | * | 10/2002 | Furuta et al. | 710/240 |
| 6,571,306 B1 | * | 5/2003 | Smith | 710/240 |
| 6,629,178 B1 | * | 9/2003 | Smith | 710/240 |
| 6,651,119 B2 | * | 11/2003 | Ghodrat et al. | 710/40 |
| 6,681,279 B1 | * | 1/2004 | Peng | 710/240 |
| 2001/0056515 A1 | * | 12/2001 | Jacobs et al. | 710/240 |
| 2002/0032820 A1 | * | 3/2002 | Jahnke et al. | 710/240 |
| 2003/0005194 A1 | * | 1/2003 | Stone et al. | 710/107 |

FOREIGN PATENT DOCUMENTS

JP         2001117861      * 10/1999     ......... G06F/13/362

OTHER PUBLICATIONS

A scheme for knowledge representation, verification and reasoning in real time asynchronous production systems. T. Siva Perraju, 1063–6730/94 @ 1994 IEEE.*

* cited by examiner

*Primary Examiner*—Mark H. Rinehart
*Assistant Examiner*—Kim T. Huynh
(74) *Attorney, Agent, or Firm*—Robert D. Marshall, Jr.; W. James Brady, III; Frederick J. Telecky, Jr.

(57) ABSTRACT

The immediate grant bus arbiter of this invention is a part in the implementation of a multiple transaction bus system. A bus bridge provides a means to connect two separate busses together and secure data integrity. The bus bridge is defined with clear master-slave protocol. The bus bridge normally involves the use of two arbiters. The arbiter on the primary bus needs to operate differently from the arbiter on the secondary bus due to real system time constraints. This invention defines a bus arbiter that allows for a dominant bus master to receive an immediate grant of control on the bus. This immediate grant bus arbiter never relinquishes the bus if another lower priority master makes a bus request. This makes predictable real time data transfer possible.

5 Claims, 4 Drawing Sheets

IMMEDIATE GRANT BUS ARBITER FOR BUS SYSTEM

This application claims priority under 35 USC §119(e)(1) of Provisional Application No. 60/231,484, filed Sep. 8, 2000.

TECHNICAL FIELD OF THE INVENTION

The technical field of this invention is data transfer and data bus systems within computer systems.

BACKGROUND OF THE INVENTION

As computer systems have grown more complex, it has become common to employ multiple processors and a wide variety of peripheral devices to transfer data within a chip and from the chip to external devices and vice versa. Such systems almost always have a multiple set of busses separating, for convenience and performance reasons, the communication between similar devices. Multiple bus systems must provide bus controllers to allow for coherent and collision-free communication between separate buses. Micro-controllers are used for this purpose and they provide bus arbitration which determines, at a given time, which device has control of the bus in question.

A prominent standard bus system has emerged for high performance micro-controller designs. The 'Advanced Micro-controller Bus Architecture System' AMBA has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

The standard AMBA has two main busses, a high performance AHB bus and a peripheral bus APB of more moderate performance. The AHB bus is the main memory bus and contains RAM and an external memory controller. In this basic system definition, if a high performance peripheral is required that will transfer large amounts of data, this peripheral is also placed on the high performance AHB bus. This decreases system performance, however, because the central processor unit (CPU) cannot have access to memory when the peripheral has control of the bus.

Advanced RISC Machines Ltd (ARM) has proposed an efficient arbitration scheme and split transfers to allow the CPU and the high performance peripheral to share bus time of the single AHB bus. ARM has also proposed use of a second bus for isolation and using a single arbiter. This proposal still allows only one transaction to progress at a given time period.

SUMMARY OF THE INVENTION

The immediate grant bus arbiter of this invention is a part in the implementation of a multiple transaction bus system. This is used in an extension of the AHB bus of ARM. The bus bridge provides a means to connect two separate AHB-style busses together and secure data integrity. Since these busses have different characteristics, one for CPU support and the other for support of a large amount of data transfer by a single peripheral, the bus bridge is defined with clear master-slave protocol. The bus bridge normally involves the use of two arbiters. The arbiter on the primary bus needs to operate differently from the arbiter on the secondary bus due to real system time constraints.

This invention defines a bus arbiter that allows for a dominant bus master to receive an immediate grant of control on a generic AHB bus. This immediate grant bus arbiter never relinquishes the bus if another lower priority master makes a bus request. This makes predictable real time data transfer possible.

BRIEF DESCRIPTION OF THE DRAWINGS

These and other aspects of this invention are illustrated in the drawings, in which.

DETAILED DESCRIPTION OF PREFERRED EMBODIMENTS

The multiple transaction advanced high performance bus system (MTAHB) of this invention is used as an upgrade to the micro-controller bus architecture AMBA of Advanced RISC Machines Ltd. (ARM). The AMBA machines use RISC processors which are identified by the name ARM processors. Advanced RISC Machines Ltd. (Cambridge, U.K.) has been awarded U.S. Pat. No. 5,740,461, dated Apr. 14, 1998 in which this class of machines is fully described. The techniques used in this invention are of wider applicability, as will be shown, and can be used in a variety of multi-processor systems having multiple bus architectures.

Figure 1:
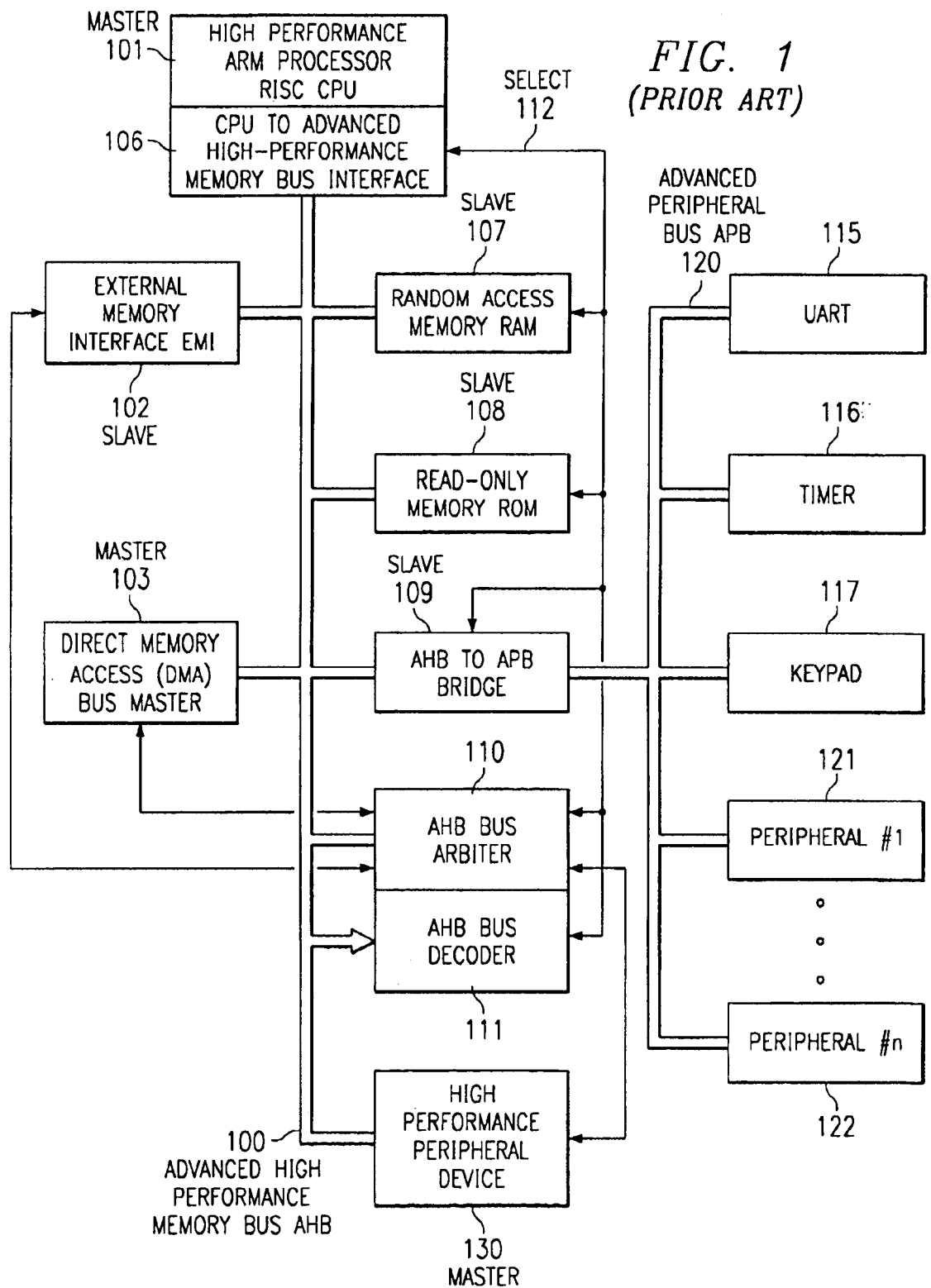
FIG. 1 illustrates the block diagram of a prior art advanced micro-controller bus architecture AMBA having a conventional AHB bus system.

FIG. 1 illustrates the AMBA standard. The AMBA has two main busses, an advanced high performance bus (AHB) 100 and an advanced peripheral bus (APB) 120 of more moderate performance. AHB bus 100 is the main memory bus and couples to CPU 101 via CPU advanced high performance memory bus interface 106 to random access memory (RAM) 107, read-only memory (ROM) 108 and an external memory interface (EMI) controller 102. FIG. 1 further illustrates a second master device direct memory access (DMA) unit 103 also coupled to AHB bus 100. Arbitration for bus access between the two masters, CPU 101 and DMA 103, takes place in M-bus arbiter 110. M-bus arbiter 110 controls access to the various slave devices via M-bus decoder 111 and select lines 112. In this basic system definition, if a high performance peripheral is required that will transfer large amounts of data, this peripheral is also placed on the high performance AHB bus 100. FIG. 1 illustrates such a high performance peripheral device 130. Placing this high performance peripheral device 130 on AHB bus 100 decreases system performance, because CPU 101 and DMA 103 cannot have access to memory when high performance peripheral device 130 has control of AHB bus 100. ARM has proposed an efficient arbitration scheme and split transfers to allow the CPU 101, DMA 103 and the high performance peripheral 130 to share bus time of the single AHB bus 100.

ARM has also proposed use of a second bus for isolation and using a single arbiter. As shown in FIG. 1, this second bus is called the advanced peripheral bus (APB) 120. APB bus 120 operates in the same fashion as AHB bus 100. APB bus 120 is connected to AHB bus 100 via an AHB-to-APB bus bridge 109. AHB-to-APB bus bridge 109 is a slave to AHB bus 100. The two bus system with single M-bus arbiter 110 is of limited usefulness, because it allows only one transaction to progress at a given time period. Note that all high performance devices including memory and high performance peripheral device 130 are on AHB bus 100. All peripheral devices of moderate performance including UART 115, timer 116, keypad 117 as well as peripherals 121 to 123 reside on the peripheral bus 120.

Figure 2:
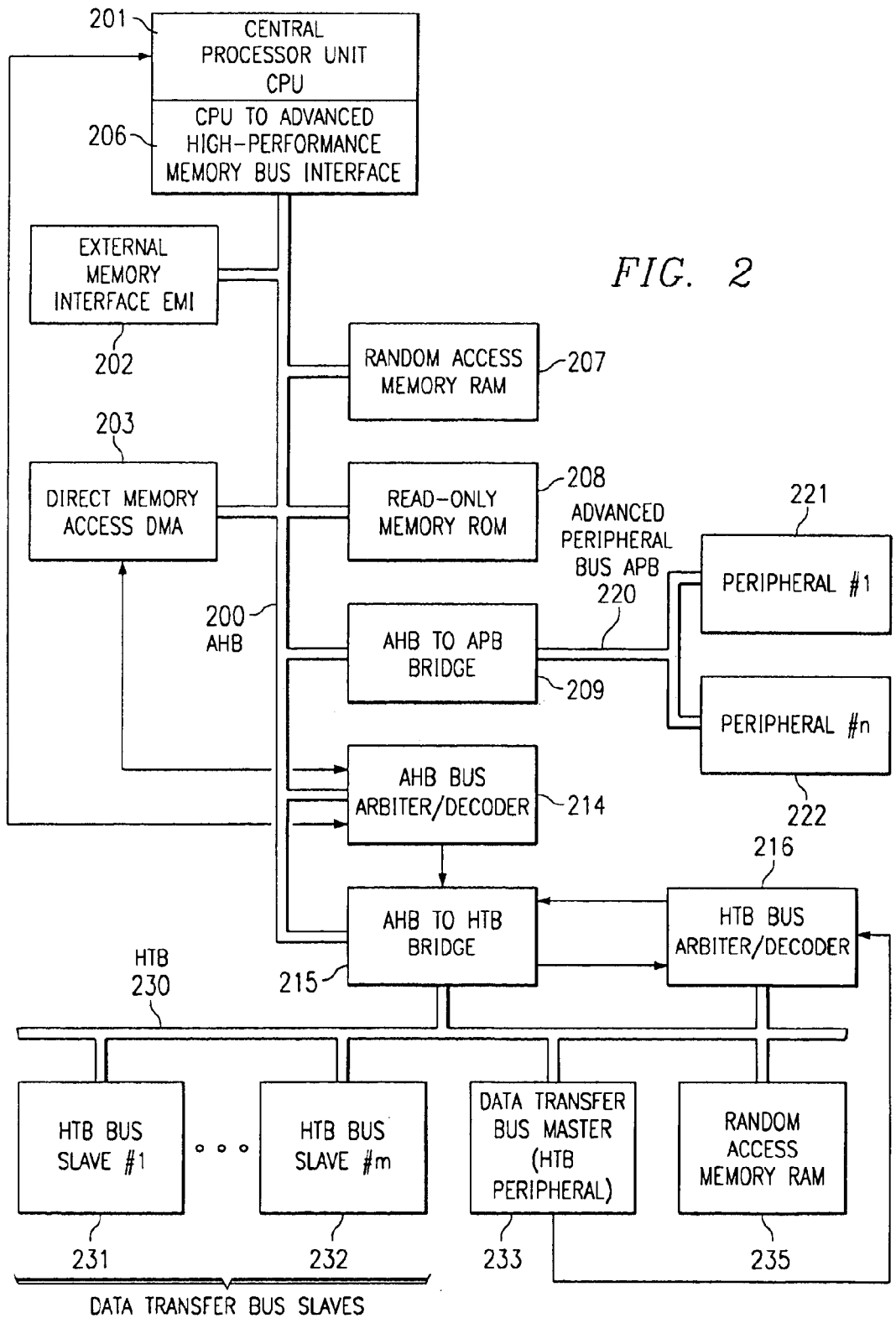
FIG. 2 illustrates the block diagram of an enhanced advanced micro-controller bus architecture having the multiple transaction two AHB-style bus system of this invention with two arbitrators.

FIG. 2 illustrates the multiple transaction advanced high performance bus system (MTAHB) used in this invention. The MTAHB uses two AHB-style buses: AHB bus 200 retained as a memory bus; and HTB bus 230 provided for high data transfer bus. AHB bus 200 has AHB bus arbiter/decoder 214 and HTB bus 230 has HTB bus arbiter/decoder 216. Communication between AHB bus 200 and HTB bus 230 takes place via AHB-to-HTB bus bridge 215. AHB-to-HTB bus bridge 215 provides more than just isolation between AHB bus 200 and HTB bus 230. AHB-to-HTB bus bridge 215 also allows for efficient communication between the two high performance busses. In this respect, MTAHB provides three main features:

1. a write buffer to reduce the number of stalls to the CPU 210 while writing to HTB bus 215;

2. a time-out counter allowing CPU 201 to change tasks if a read of HTB bus 230 takes too long; and 3. a set of control registers and control logic as required in bus-master devices.

The AHB bus 200 should contain as slaves only the blocks closely related to memory as well as AHB-to-APB bus bridge 209 to APB bus 220 and AHB-to-HTB bus bridge 215 to HTB bus 230. Note that APB bus 220 connects to moderate performance peripherals 221 to 222 in the same manner as illustrated in FIG. 1. HTB bus 230 contains bus slave peripherals 231 and 232, bus master peripheral 233 and RAM 235. HTB bus 230 supports only two bus masters, high priority data transfer bus master peripheral 233 and AHB-to-HTB bus bridge 215. If more bus masters are required, another HTB bus can be added to the system through the use of another AHB-to-HTB bus bridge, connected as a slave on AHB bus 200.

In the preferred embodiment the immediate grant bus arbiter of this invention is used with the multiple transaction advanced micro-controller bus architecture MTAHB. The immediate grant bus arbiter technique is of wide applicability, as will be shown, and can be used in a variety of multi-processor systems having multiple bus architectures.

The AMBA specification does not define AHB bus arbitration techniques. This was clear intention of the specification in that there is benefit to having the freedom to adopt a range of possibilities. One conventional technique for arbitration is to use a round-robin scheme. This grants control of the bus to one master at a time going from the first to the last and back to the first, but with no prevailing priority. Another technique is to give priority to the last used master when there is an idle condition. This is based on the concept that a process is occurring but has slowed or idled for some reason and the last working master will probably need the bus next. Finally, conventional techniques for arbitration could be a specifically defined random process.

Figure 3:
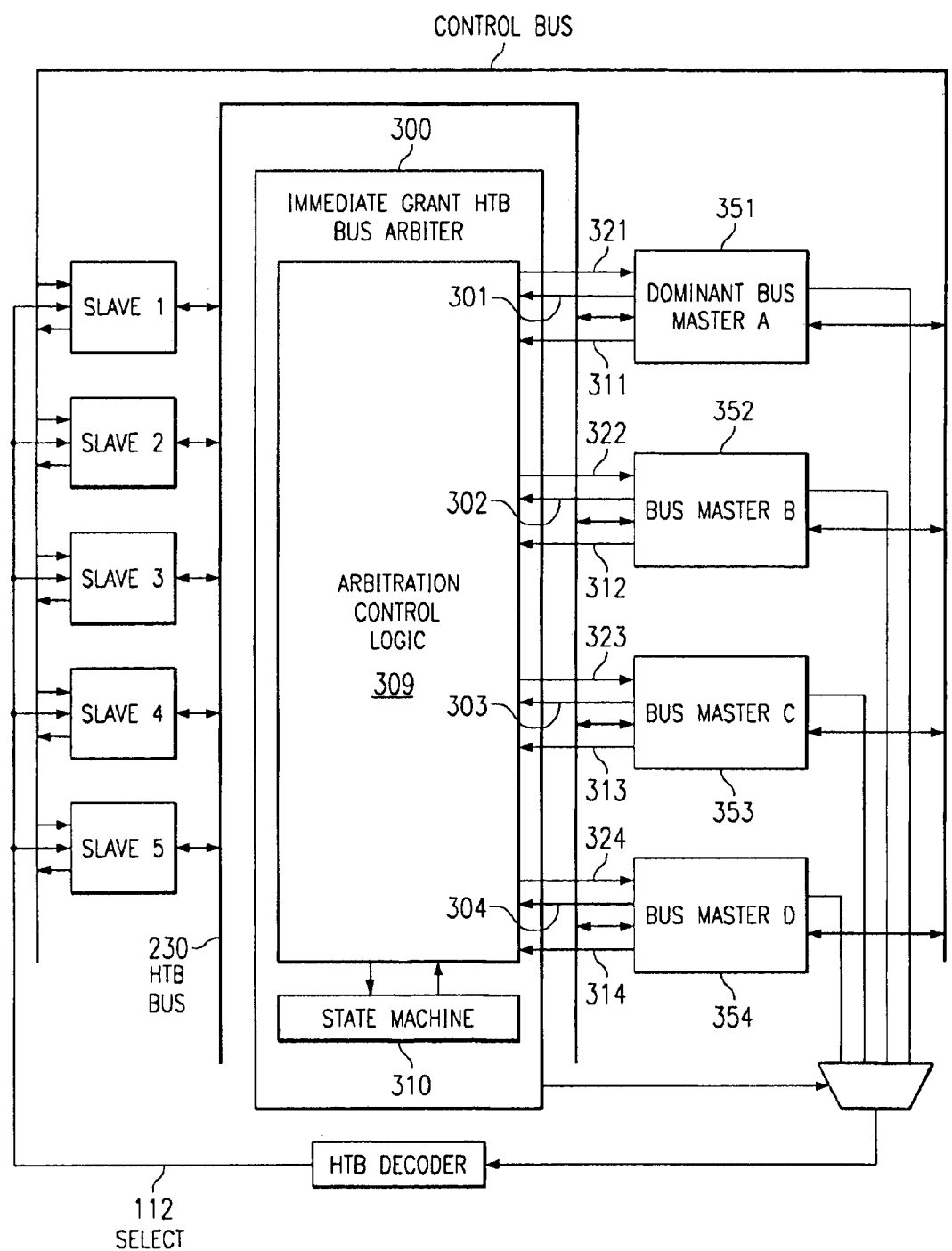
FIG. 3 illustrates the high data transfer bus arbitration function with immediate grant bus arbiter.
Figure 4:
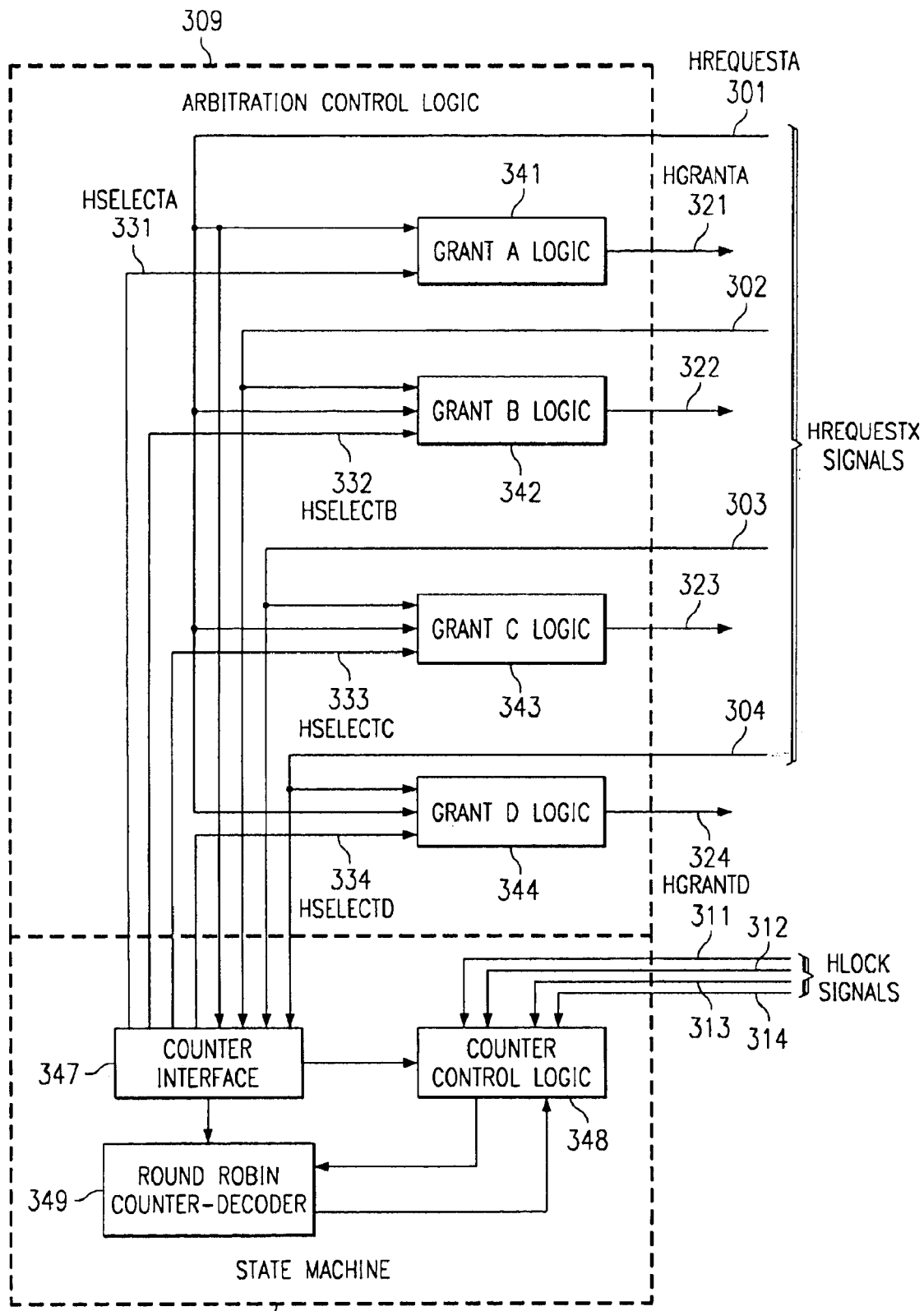
FIG. 4 illustrates arbitration control logic illustrated in FIG. 3.

FIG. 3 illustrates an immediate grant bus arbiter 300 in a preferred embodiment used to insure the control of the bus to the dominant master immediately upon request. The preferred embodiment example employs the round-robin type of arbiter and uses four masters, one of which is dominant. The immediate grant bus arbiter 300 includes two major blocks, arbitration control logic 309 and state machine 310. FIG. 4 illustrates details of the arbitration control logic 309. This arbitration control logic 309 contains grant logic blocks 341, 342, 343, and 344, one for each bus master 351, 352, 353, and 354 respectively. Bus Master A 351 is the dominant master. Each bus master 351, 352, 353 and 354 interfaces to the immediate grant bus arbiter 300 first through respective HRequest signals 301, 302, 303, and 304. State machine 310 successively selects each master in order (round-robin scheme) and delivers HSelect signals 331, 332, 333, and 334 to the respective HGrantA logic 341, HGrantB logic 342, HGrantC logic 343 and HGrantD logic 344 (FIG. 4).

Assume first that no bus masters are actively controlling the bus. If any single bus master X issues a bus request by activating its corresponding HRequest signal 301, 302, 303 or 304, then this request will be acted upon when the corresponding HSelect signal 321, 322, 323 and 324 becomes active in its turn in the order of round-robin counter states.

If a non-dominant master, represented in FIG. 3 by Bus Master C 353, for example, makes a request for bus control, the signal HRequestC 303 goes active. If another bus master D 354, for example, already has control, its HLockD signal 314 is active inhibiting the counter from cycling to the state which will serve bus master C 353.

If no other transfer processes are active involving other masters, state machine 310 will cycle through its states and return to apply an active HSelectC 333 to HGrantC Logic 343. The HGrantC signal 323 then goes active. This causes bus master C 353 to return an active HLockC signal 313 to the counter control logic 348 (FIG. 4), signifying that bus master C 353 has control of the bus. At this point bus master C 353 will release HRequest C signal 303 to an inactive state. The HGrantC signal 323 will remain active until the transfer is complete. Counter control logic 348 acts upon the active HLockC signal 313 applying an inhibit signal to the counter-decoder block 349, inhibiting counter action and freezing HSelect signals 332, 333 and 334. When bus master C 353 completes its data transfer processes, it allows HLockC signal 313 to go inactive. Counter control logic 348 no longer inhibits counter-decoder block 349 which resumes round-robin action. Counter interface 347 allows HGrantC signal 323 to go inactive. This readies immediate grant bus arbiter 300 for another bus grant.

Suppose the dominant master, in this example bus master A 351, makes a request for bus control by assertion of HREQUESTA signal 301. HREQUESTA signal 301 is routed to HGrantA logic 341 in the normal fashion. HREQUESTA signal 301 is also routed to HGrantB logic 342, HGrantC logic 343 and HGrantD logic 344 inhibiting possible bus control from being passed to bus masters B 352, bus master C 353 or bus master D 354 even if state machine 310 has selected one of them based on the round robin algorithm.

If a non-dominant bus master already has control of HTB bus 230, the occurrence of HREQUESTA signal 301 at the corresponding HGrantB logic 342, HGrantC logic 343 or HGrantC logic 344 will initiate a hold on that control. Non-dominant bus masters 352, 353 and 354 served by grant immediate bus arbiter 300 are configured to suspend transfer action and store status of the suspension until control can be restored through normal HRequest signaling. State machine 310, acting upon the immediate grant request of dominant bus master A 351, will cycle through its states and in turn will apply an active HSelectA signal 331 to HGrantA logic 341. HGrantA signal 321 then goes active causing dominant bus master A 351 to return HLockA signal 311 to counter control logic 348. This signals that bus master A 351 has taken control of HTB bus 230. Counter control logic 348 applies appropriate control to the counter-decoder block 349, inhibiting counter action and freezing the HSelect signals. Upon completion of dominant bus master A 351 data transfer, HLockA signal 321 goes inactive and round-robin action resumes.

In a real-time application, where the events that trigger an HTB bus peripheral occur externally to CPU 201, a priority scheme must be created that will insure the speedy transfer of data from the HTB bus peripheral to its destination, which may be another peripheral or memory. Due to the non-deterministic behavior inherent to generic AHB bus arbitration, HTB bus arbiter/decoder 216 will always grant HTB bus 230 to the peripheral on the highest channel. In this example that is dominant bus master A 351. Even if AHB-to-HTB bus bridge 215 has control of HTB bus 230, if dominant bus master A 351 requests control, them HTB bus arbiter/decoder 216 will suspend the current AHB-to-HTB operation and grant control to dominant bus master A 351. AHB-to-HTB bus bridge 215 will handle the stall operations during a write in a write buffer or from a read by initiating a time-out counter.

Referring to FIG. 2, there will normally be only two possible masters on HTB bus 230: one dominant bus master 233 and AHB-to-HTB bus bridge 215. The dominant bus master 233 will occupy a higher priority, while AHB-to-HTB bus bridge 215 occupies the lower.

What is important is that, for real-time situations, normally it is necessary to give a single master super priority, so that it can never lose arbitration. This HTB bus master is the dominant HTB bus master (DHTBM). If DHTBM controls the bus at a given time, it will never lose it until it is finished with its data transfer and all other processes wait. If DHTBM requests the bus, it is given immediate control, forcing AHB-to-HTB bus bridge 216 to suspend processes. There are some real-time constraints with some modules. Thus allowing inherent non-deterministic bus arbitration to be the only rule would have a negative overall impact on real-time systems.

What is claimed is:

1. A data transfer system comprising:

a plurality of first bus devices, at least one first bus device being a first bus data supplying device capable of supplying data, at least one first bus device being a first bus data receiving device capable of receiving data and at least one first bus device being a first bus master device capable of requesting and controlling data transfer and at least one first bus devices and capable of transferring data from a first bus data supplying device to a first bus data receiving device under control of a first bus master device;

a first data bus connected to each of said plurality of first bus devices and capable of transferring data from a first bus data supplying device to a first bus data receiving device under control of a first bus master device;

a plurality of second bus devices, at least one second bus device being a second bus data supplying device capable of supplying data, at least one second bus device being a second bus data receiving device capable of receiving data, a plurality of second bus devices each being a second bus master device capable of requesting and controlling data transfer, a predetermined one of said plurality of second bus devices being a dominant second bus master device responsive to real time events asynchronous to operation of said central processing unit;

a second data bus connected to each of said plurality of second bus devices and capable of transferring data from a second bus data supplying device to a second bus data receiving device under control of a second bus master device;

a bus bridge connected to said first data bus and said second data bus, said bus bridge capable of supplying data to said first bus, receiving data from said first bus, supplying data to said second bus, receiving data from said second bus, not capable of controlling data transfer on said first bus and capable of controlling data transfer on said second bus; and a second bus arbiter connected to each of said at least one second bus master device, said second bus and said bus bridge, said second bus arbiter granting control of data transfer on said second bus to one and only one of the set of devices including each second bus master and said bus bridge, said second bus arbiter granting control of data transfer to said dominant second bus master immediately upon request and interrupting any data transfer controlled by another second bus master.

2. The data transfer system of claim 1, wherein:

said at least one first bus master device consists of a direct memory access unit.

3. The data transfer system of claim 1, wherein:

at least one first bus supplying/receiving device consists of a memory which is not capable of controlling data transfer.

4. The data transfer system of claim 1, wherein:

each second bus master generates a corresponding bus request signal to said second bus arbiter for second bus to request control of said second bus, said second bus arbiter having grant logic corresponding to each second bus master supplying a bus grant signal to said corresponding bus master upon bus grant, said bus request signal of said dominant bus master supplied to said grant logic corresponding to every other second bus masters for inhibiting generation of said grant request.

5. The data transfer system of claim 4, wherein:

said bus arbiter grants control of said second bus to second bus master devices other than dominant bus master in a round robin fashion.

* * * * *